Aug. 27, 1963 J. MATARESE 3,102,242

OSCILLATOR WITH ELECTROLUMINESCENT AND PHOTOCONDUCTIVE ELEMENTS

Original Filed May 1, 1957

INVENTOR.
JOHN MATARESE

BY

ATTORNEY.

United States Patent Office 3,102,242

Patented Aug. 27, 1963

3,102,242

OSCILLATOR WITH ELECTROLUMINESCENT AND PHOTOCONDUCTIVE ELEMENTS

John Matarese, Bronx, N.Y., assignor, by mesne assignments, to Sylvania Electric Products Inc., Wilmington, Del., a corporation of Delaware Original application May 1, 1957, Ser. No. 656,338, now Patent No. 2,898,556, dated Aug. 4, 1959. Divided and this application Apr. 16, 1959, Ser. No. 810,205

2 Claims. (Cl. 331—107)

Figure 1:
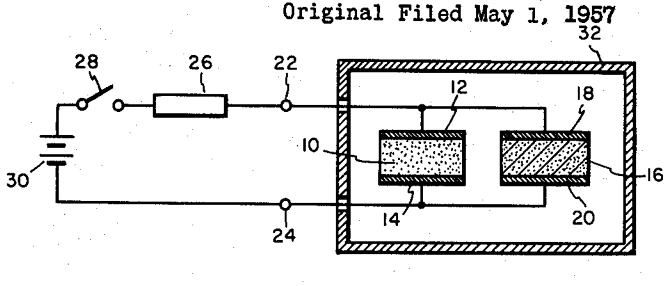

My invention is directed toward electrical devices incorporating electroluminescent and photoconductive elements. This application is a division of application Serial No. 656,338, filed May 1, 1957, now Patent No. 2,898,556.

It is an object of the present invention to provide a new and improved electrical device, such as an amplifier or oscillator in which are incorporated both electroluminescent and photoconductive elements.

Another object is to provide a new and improved electrical device, wherein electrical interaction between input and output circuits of the device is obtained through the use of light as a control medium.

Still another object is to provide a new and improved electrical amplifier or oscillator incorporating electroluminescent and photoconductive elements in parallel connection.

These and other objects of my invention will either be explained or will become apparent hereinafter.

In accordance with the principles of my invention, I provide an electroluminescent layer, first and second opposite faces of which are respectively coated with first and second electrically conductive films. I further provide a photoconductive layer, first and second opposite faces of which are respectively coated with third and fourth electrically conductive films. The first and third films are connected to a first common terminal and constitute a first electrically conductive element, the second and fourth films are connected to a second common terminal and constitute a second electrically conductive element.

The two layers are positioned in such manner that light emitted from the electroluminescent layer strikes the photoconductive layer. The photoconductive layer must be photosensitive to the light emitted from the electroluminescent layer.

A series circuit including a voltage source, a switch and an impedance element is connected between the first and second terminals. The value of this impedance element is much lower than the impedance represented by the paralleled layers when the photoconductive layer is dark and is much higher than the impedance of the photoconductive layer when illuminated.

When the switch is open, no voltage is applied across the two layers and hence the electroluminescent layer does not emit light and the photoconductive layer is not illuminated. At the instant the switch is closed, a major portion of the voltage supplied by the source is applied across the paralleled layers and the electroluminescent layer emits light. This pulse irradiates the photoconductive layer and its impedance begins to decrease. As the impedance of the photoconductive layer decreases, the voltage across the impedance element increases and the voltage across the paralleled layers decreases. This process continues until the voltage across the paralleled layers is quite small and the electroluminescent layer emits no light. The photoconductive layer then is dark, and its impedance continuously increases toward its original value. As the impedance of the photoconductive layer increases, the voltage across the electroluminescent layer increases until the electroluminescent layer again emits light and the entire process repeats.

As a result both the voltage across the paralleled layers and the voltage across the impedance element are alternating voltages varying at a frequency dependent upon the rate of change of impedance of the photoconductive layer. Hence, the arrangement disclosed above functions as an oscillator.

If desired, the two paralleled layers can be combined with an integral structure by placing the layers together in such manner that either the first and third films or the second and fourth films form a common film in contact with one side of each layer. Provided that the common film is transparent, this structure can be connected to the series circuit in the manner previously described and will operate in the same manner.

Figure 2:
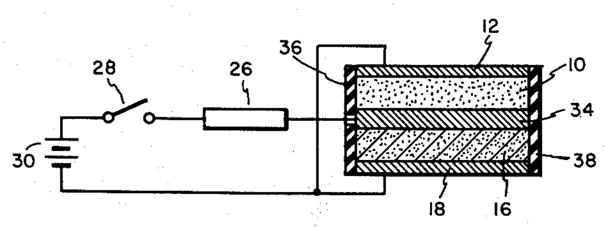

Illustrative embodiments of my invention will now be described in detail with reference to the accompanying drawings wherein FIG. 1 illustrates one embodiment of my invention;

FIG. 2 illustrates another embodiment of my invention; and

Figure 3:
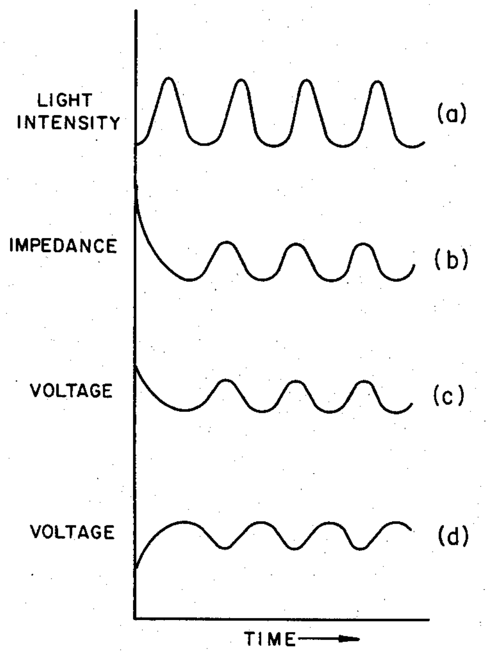

FIG. 3, *a*, *b*, *c* and *d* are graphs illustrating the time dependence of various circuit parameters of the embodiments shown in FIGS. 1 and 2.

Referring now to FIG. 1, there is shown an electroluminescent layer 10, opposite sides of which are coated with electrically conductive films 12 and 14. Spaced apart from layer 10 is a photoconductive layer 16, opposite sides of which are coated with electrically conductive films 18 and 20. Films 18 and 12 are connected to a first common terminal 22 and constitute a first electrically conductive element; films 14 and 20 are connected to a second common terminal 24 and constitute a second electrically conductive element. A series circuit including an impedance element 26, a switch 28 and a battery 30 is connected between terminals 22 and 24. A light tight box 32 encloses layers 10 and 16.

The impedance of element 26 is much higher than the impedance of layer 16 when illuminated and is much lower than the paralleled impedance of layers 10 and 16 when layer 16 is dark.

When the switch is closed, a major portion of the voltage supplied from battery 30 appears across the paralleled layers 10 and 16, and layer 10 emits light, the intensity of which is proportional to the applied voltage.

The emitted light irradiates layer 16 and its impedance begins to decrease. As the impedance of layer 16 decreases, the voltage drop across layers 10 and 16 begins to decrease and the initially small voltage drop across element 26 begins to increase. The light output from layer 10 which has previously attained a maximum value begins to decrease or decay.

At this point, the impedance of layer 16 begins to increase. The voltage drop across element 26 then begins to decrease, and the voltage drop across layers 10 and 16 begins to increase, thereby increasing the electric field across layer 10. As the field increases, light is emitted from layer 10, and the process is repeated.

Consequently, alternating voltages appear across element 26 and across the paralleled layers 10 and 16, the frequency of these voltages being determined primarily by the time rate of change of the impedance of layer 16 in response to light irradiation, or stated differently, the frequency is primarily determined by the decay period of layer 16.

Appropriate wave forms of the variations of impedance voltages and emitted light as a function of time are shown in the drawings, wherein FIG. 3*a* illustrates the variation intensity of light emitted from layer 10; FIG. 3*b* illustrates the variation in impedance of layer 16; and FIGS. 3*c* and 3*d* respectively illustrate the voltage variations across element 26 and the paralleled layers 10 and 16.

FIG. 2 shows a modification of the arrangement of FIG. 1 wherein the layers 10 and 16 are arranged one above the other and films 14 and 20 are replaced by a single transparent electrically conductive film 34 in contact with both layers. Further, the box 32 of FIG. 1 is replaced by two insulating light opaque films 36 and 38 which coat opposite sides of both layers 10 and 16. This modification functions as an oscillator in the same manner as indicated previously.

Since the impedances of layers 10 and 16 are primarily resistive at least to a first approximation, element 26 can take the form of a resistor and oscillations can still be produced in substantially the same manner as above. By removing a portion of the opaque film 36 the variations in the light emitted from layer 10 can be observed or utilized as necessary.

While I have shown and pointed out my invention as applied above, it will be apparent to those skilled in the art that many modifications can be made within the scope and sphere of my invention as defined in the claims which follow.

What is claimed is:

1. An electroluminescent device comprising (*a*) a hollow opaque enclosure containing (*b*) an electroluminescent layer provided with first and second opposite faces respectively coated with first and second electrically conductive films, (*c*) a photoconductive layer provided with first and second faces respectively coated with third and fourth electrically conductive films positioned adjacent said electroluminescent layer, said electroluminescent layer being isolated from incident radiation by said opaque enclosure and said photoconductive layer receiving radiation only from said electroluminescent layer, (*d*) means electrically coupling said first and third films to a first terminal, and (*e*) means electrically coupling said second and fourth films to a second terminal, said electroluminescent layer emitting light in response to a voltage applied across said first and second terminals when said photoconductive layer has a high impedance and not emitting light when said photoconductive layer has a low impedance, the impedance of said photoconductive layer being determined by the light emitted by said electroluminescent layer.

2. The electroluminescent device defined by claim 1 wherein the means electrically coupling said first and third films to said first terminal is an impedance element, said impedance element having an impedance which is lower than the parallel impedance of said electroluminescent and photoconductive layers when said photoconductive layer is dark and higher than said parallel impedance when said photoconductive layer is illuminated.

References Cited in the file of this patent

UNITED STATES PATENTS

| | | |
|---|---|---|
| 2,895,054 | Loebner | July 14, 1959 |
| 2,908,824 | Nicoll | Oct. 13, 1959 |